US007830654B2

(12) United States Patent
Hsieh et al.

(10) Patent No.: US 7,830,654 B2
(45) Date of Patent: Nov. 9, 2010

(54) SCREW-LESS FASTENING DEVICE

(75) Inventors: Chia-Pin Hsieh, Taipei (TW); Ching-Chiang Chen, Taipei (TW)

(73) Assignees: Silitek Electronic (Guangzhou) Co., Ltd., Guangzhou (CN); Lite-On Technology Corporation, Taipei City (TW)

( * ) Notice: Subject to any disclaimer, the term of this patent is extended or adjusted under 35 U.S.C. 154(b) by 218 days.

(21) Appl. No.: 12/232,927

(22) Filed: Sep. 26, 2008

(65) Prior Publication Data
US 2009/0310294 A1 Dec. 17, 2009

(30) Foreign Application Priority Data
Jun. 13, 2008 (CN) .................. 2008 1 0028814

(51) Int. Cl.
*G06F 1/16* (2006.01)
(52) U.S. Cl. .............................. 361/679.33; 312/223.1
(58) Field of Classification Search ........... 361/679.33, 361/747; 312/223.1
See application file for complete search history.

(56) References Cited

U.S. PATENT DOCUMENTS

| 4,979,909 | A  | * | 12/1990 | Andrews ............... 361/679.31 |
| 6,297,952 | B1 | * | 10/2001 | Liu et al. ............... 361/679.31 |
| 6,313,985 | B1 | * | 11/2001 | Chen et al. ............ 361/679.33 |
| 6,473,313 | B1 | * | 10/2002 | Chen et al. ............ 361/679.36 |
| 6,621,696 | B1 | * | 9/2003  | Wang .................... 361/679.33 |
| 6,654,240 | B1 | * | 11/2003 | Tseng et al. ........... 361/679.33 |
| 6,667,880 | B2 | * | 12/2003 | Liu et al. ............... 361/679.35 |
| 7,036,783 | B2 | * | 5/2006  | Chen et al. ............ 361/679.39 |
| 7,218,512 | B2 | * | 5/2007  | Han ....................... 312/223.1 |
| 7,233,490 | B1 | * | 6/2007  | Lai ....................... 361/679.33 |
| 7,259,960 | B2 | * | 8/2007  | Hua et al. .............. 361/679.33 |
| 7,408,767 | B2 | * | 8/2008  | Han ....................... 312/223.2 |
| 7,408,771 | B2 | * | 8/2008  | Chen et al. ............ 361/679.33 |
| 7,428,147 | B2 | * | 9/2008  | Lin ....................... 361/679.33 |
| 7,440,270 | B2 | * | 10/2008 | Zheng et al. ........... 361/679.33 |
| 7,486,510 | B2 | * | 2/2009  | Han et al. .............. 361/679.33 |
| 7,495,908 | B2 | * | 2/2009  | Zhang et al. ........... 361/679.33 |
| 7,495,909 | B1 | * | 2/2009  | Chen et al. ............ 361/679.37 |
| 7,551,434 | B2 | * | 6/2009  | Zhu et al. .............. 361/679.33 |
| 2009/0189042 | A1 | * | 7/2009 | Chen et al. ............ 361/679.33 |

* cited by examiner

*Primary Examiner*—Lisa Lea-Edmonds
(74) *Attorney, Agent, or Firm*—Rosenberg, Klein & Lee

(57) ABSTRACT

A screw-less fastening device is used for fastening a peripheral into a housing. The peripheral and the housing respectively have a first positioning hole and a second positioning hole. The screw-less fastening device includes a body and a fastening bracket. The interior of the body has two track slots and two plugging slots. The track slot includes a first slanted surface and a second slanted surface. The body slides between a first location and a second location. The fastening bracket is assembled in the body, and includes a base portion, two contacting portions and two plugging portions. The contacting portions are located in the track slots, and contact the first slanted surface and the second slanted surface. The two plugging portions are located in the plugging slots.

7 Claims, 5 Drawing Sheets

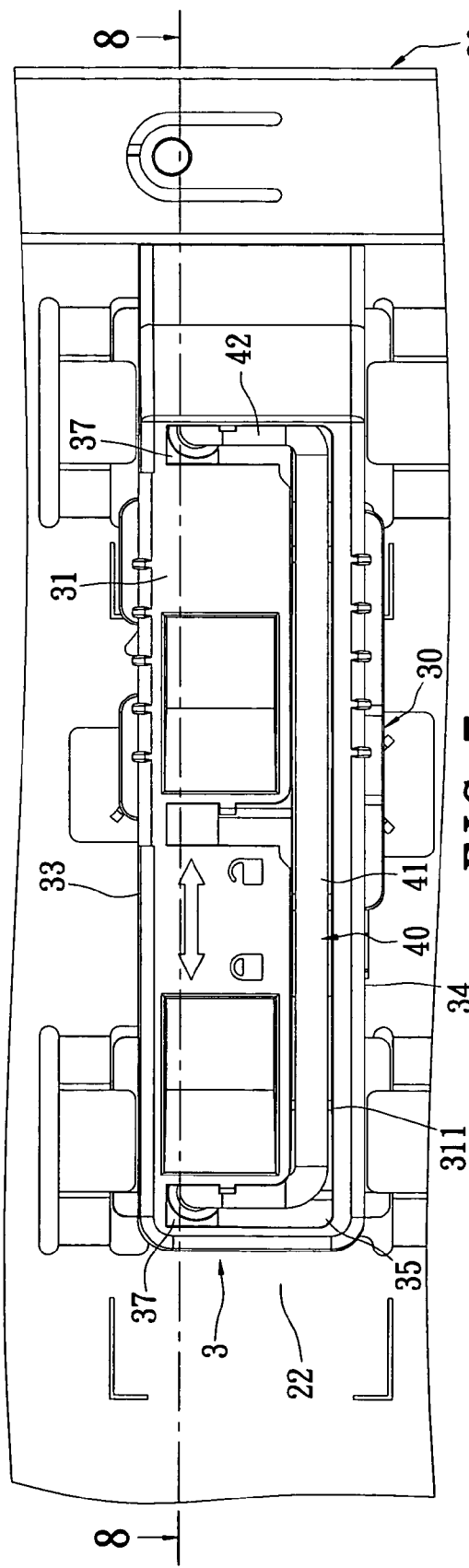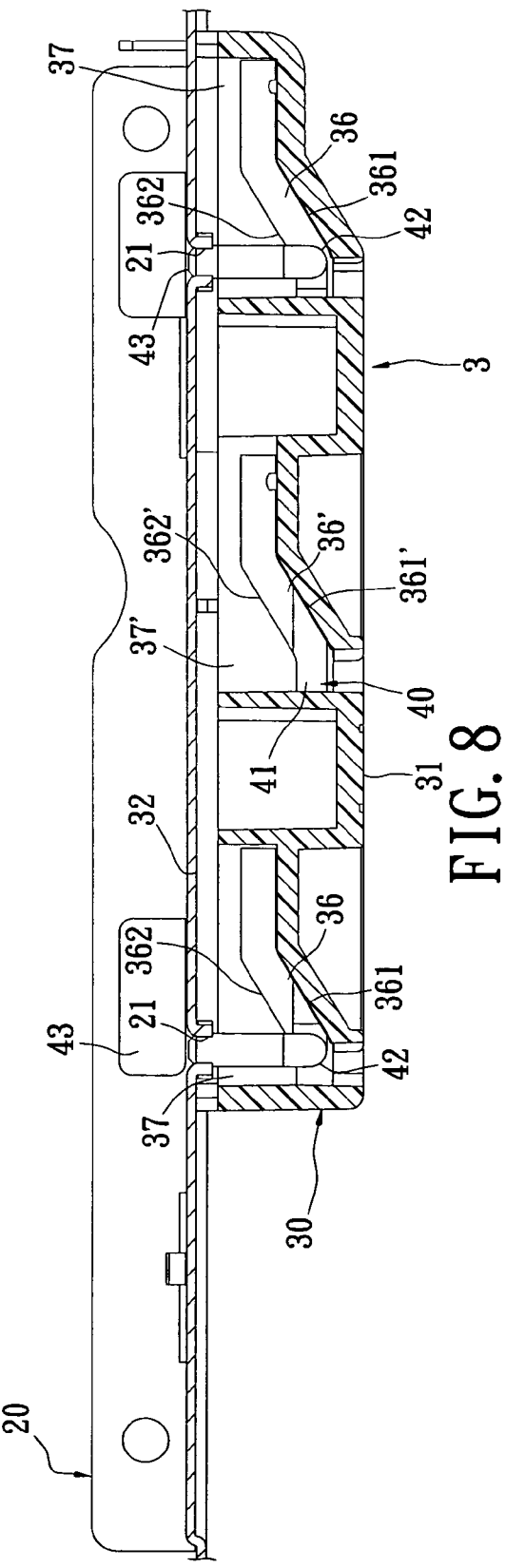

SCREW-LESS FASTENING DEVICE

BACKGROUND OF THE INVENTION

1. Field of the Invention

The present invention relates to a screw-less fastening device. In particular, the present invention relates to a screw-less fastening device that is applied to a computer system to fasten peripherals in the housing.

2. Description of Related Art

In the prior art, peripherals are usually fastened in the computer housing via screws. The peripherals are screwed onto fixtures inside the housing.

However, this fastening way needs a tool (such as a screwdriver) and a lot of screws. The process is complex and time-consuming, and the screws are easily lost. It is inconvenient for the user.

Moreover, when a screw drops onto the motherboard, a short-circuit may ensue when the computer is powered on, causing substantial damage.

SUMMARY OF THE INVENTION

One particular aspect of the present invention is to provide a screw-less fastening device with which the user can rapidly fasten and disassemble peripherals without using tools or screws. The time for fastening and disassembling peripherals is reduced.

The screw-less fastening device is used for fastening a peripheral in a housing. The peripheral has at least one first positioning hole. One side of the housing has at least one second positioning hole. The screw-less fastening device includes a body and a fastening bracket formed by bending a metal wire. The body has a front surface and a rear surface that is opposite the front surface and is close to the housing. The interior of the body has a receiving space and at least two track slots linked to the receiving space. The front surface of the body has an opening that is linked to the receiving space. Each track slot includes a first slanted surface formed by the body, and a second slanted surface that is parallel to the first slanted surface. The inner wall of the receiving space of the body has at least two plugging slots that pass through the rear surface of the body. The fastening bracket is received in the receiving space via the opening of the body. The fastening bracket includes a base portion, two contacting portions extending from two ends of the base portion that is bent, and two plugging portions extending from the two contacting portions that are bent. Each contacting portion is located in the track slot and two sides of the contacting portion individually contact the first slanted surface and the second slanted surface. The two plugging portions are located in the two plugging slots.

The body slides between a first position and a second position. When the body slides to the first position, the fastening bracket moves to the housing and each of the plugging portions is plugged into the first positioning hole and the second positioning hole so that the peripheral is fastened inside the housing.

The present invention has the following characteristics. When the peripheral is installed to or disassembled from the computer housing, the required manpower and time are reduced, and the user does not need screws and screwdrivers.

For further understanding of the present invention, reference is made to the following detailed description illustrating the embodiments and examples of the present invention. The description is for illustrative purpose only and is not intended to limit the scope of the claim.

BRIEF DESCRIPTION OF THE DRAWINGS

The drawings included herein provide a further understanding of the present invention. A brief introduction of the drawings is as follows:

FIG. 7 is a front view of the screw-less fastening device combining with the housing and sliding to the second location of the present invention; and FIG. 8 is a cross-sectional view of the cross-section 8-8 in FIG. 7.

DETAILED DESCRIPTION OF PREFERRED EMBODIMENTS

Figure 1:
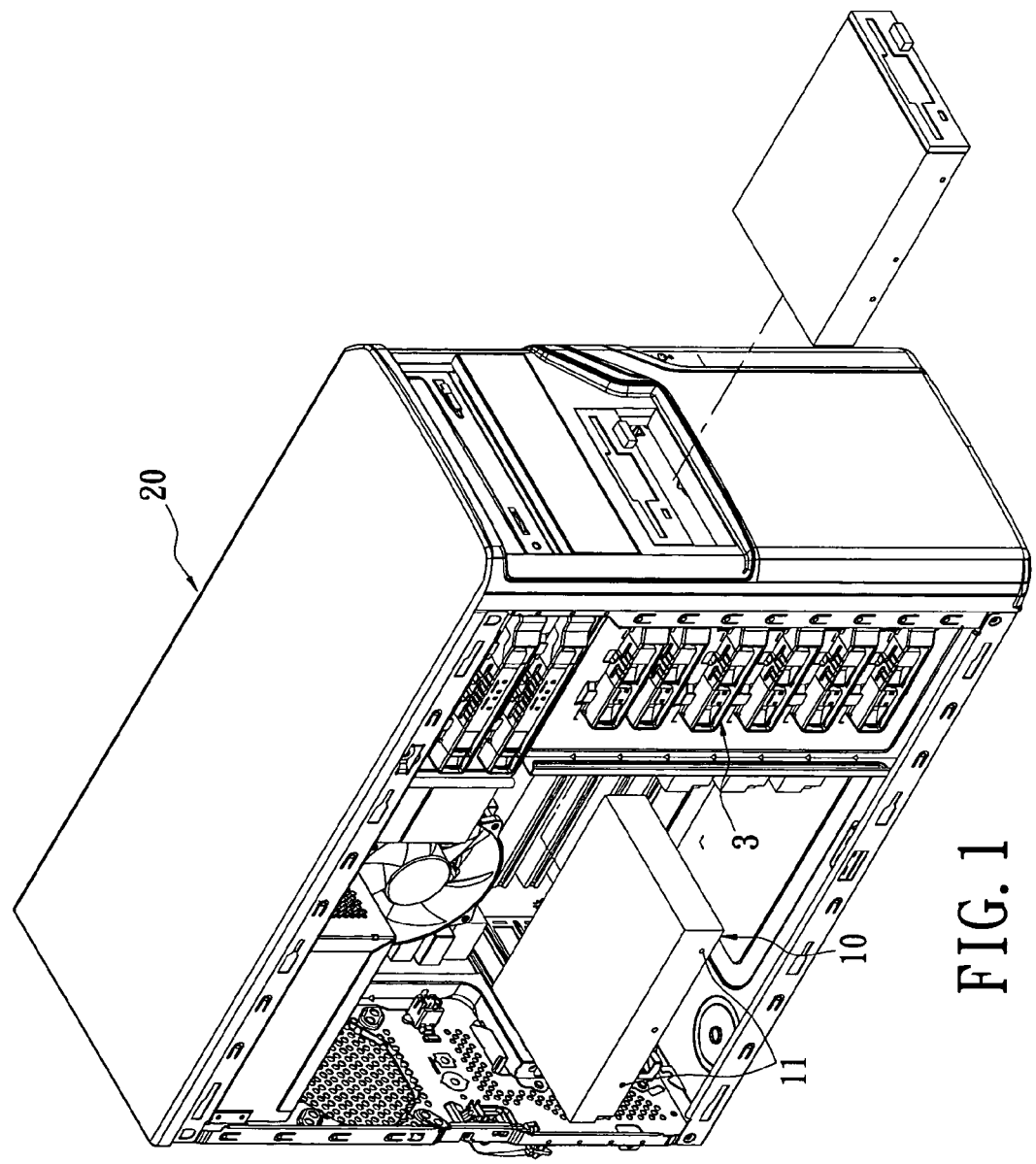
FIG. 1 is an assembly perspective view of the screw-less fastening device and the housing of the present invention.
Figure 2:
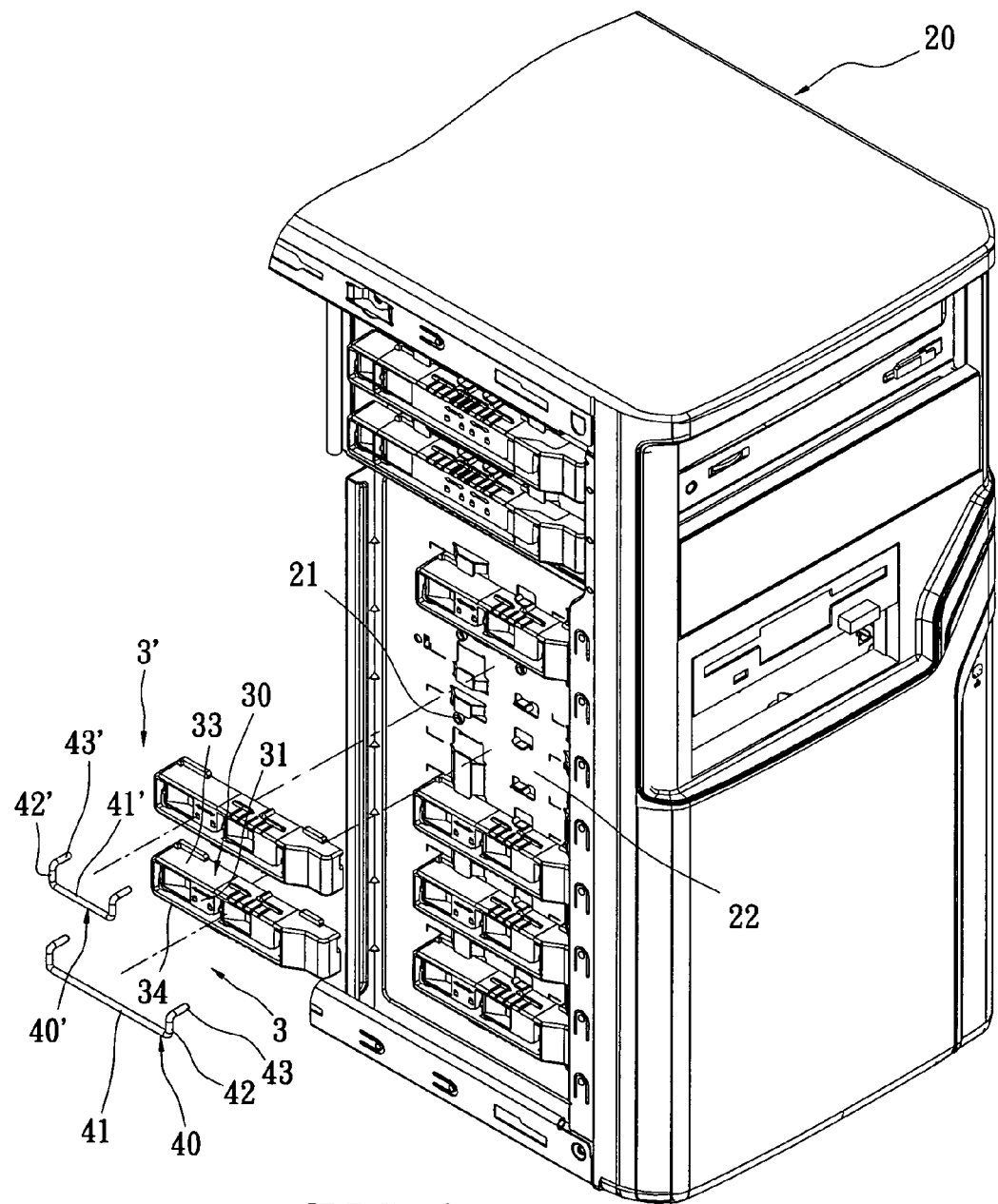
FIG. 2 is an exploded perspective view of the screw-less fastening device and the housing of the present invention.
Figure 3:
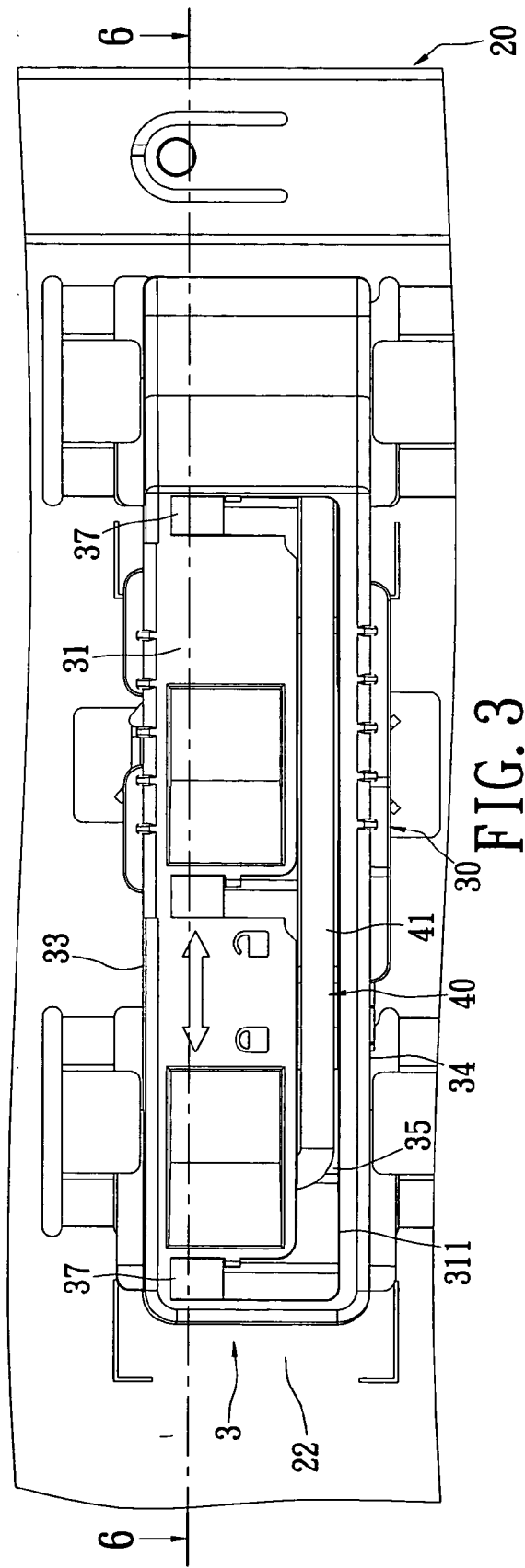
FIG. 3 is a front view of the screw-less fastening device combined with the housing and in the first position according to the present invention.

Reference is made to FIGS. 1~6. The screw-less fastening device 3 of the present invention is used for fastening a peripheral 10. The peripheral 10 can be a hard disk drive (HDD), a floppy disk drive (FDD), a magnetic card reader (MCR), an optical disk drive (ODD), but is not limited to the above.

The peripheral 10 is located in a housing 20, and one side of the peripheral has at least one first positioning hole 11. The housing 20 has at least one second positioning hole 21 that corresponds to the first positioning hole 11. One side of the housing 20 has a guiding device the shape of which matches the shape of the screw-less fastening device 3 for installing the screw-less fastening device 3 onto one side of the housing 20 and making the screw-less fastening device 3 slide into a sliding space 22 (referring to FIG. 2).

The screw-less fastening device 3 includes a body 30 and a fastening bracket 40. The body 30 is made of plastic material with a general level. The body 30 has a front surface 31, a rear surface 32 opposite the front surface 31 (referring to FIG. 4), a top surface 33 that is connected with the top of the front surface 31 and the rear surface 32, and a bottom surface 34 that is connected with the bottom of the front surface 31 and the rear surface 32. The rear surface 32 is close to one side of the housing 20.

The interior of the body 30 has a receiving space 35, at least two track slots 36, and at least two plugging slots 37. The receiving space 35 is used for receiving the fastening bracket 40. The front surface 31 of the body 30 has an opening 311 linked to the receiving space 35. The opening 311 is U-shaped, and is used for plugging the fastening bracket 40.

Figure 5:
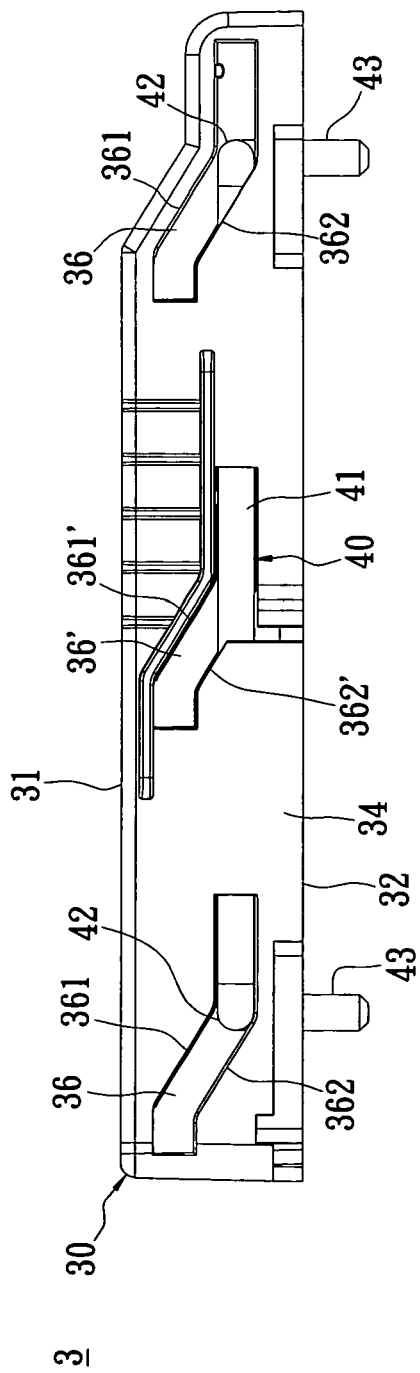
FIG. 5 is a bottom view of the screw-less fastening device of the present invention.
Figure 6:
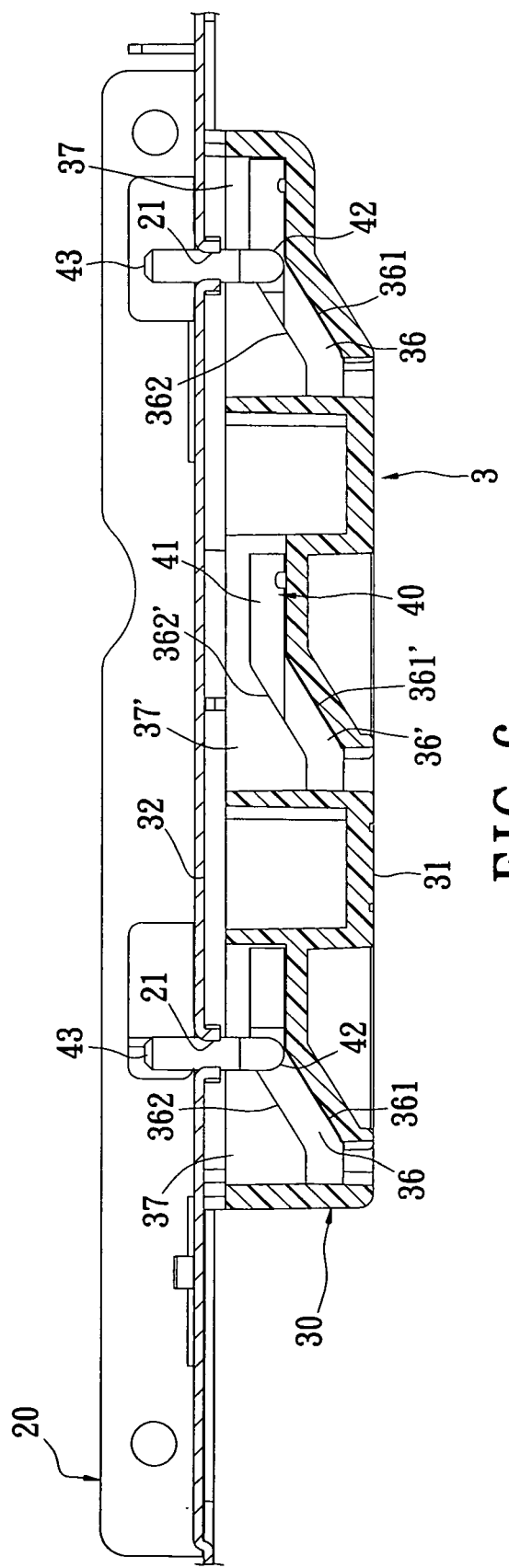
FIG. 6 is a cross-sectional view of the cross-section 6-6 in FIG. 3.

Each of the track slots 36 includes a first slanted surface 361 formed by the body 30, and a second slanted surface 362 (referring to FIG. 5). The second slanted surface 362 is parallel to the first slanted surface 361. The two track slots 36 respectively are located at two ends of the body 30 and link with the receiving space 35. The two track slots 36 pass through the bottom surface 34 of the body 30.

Figure 4:
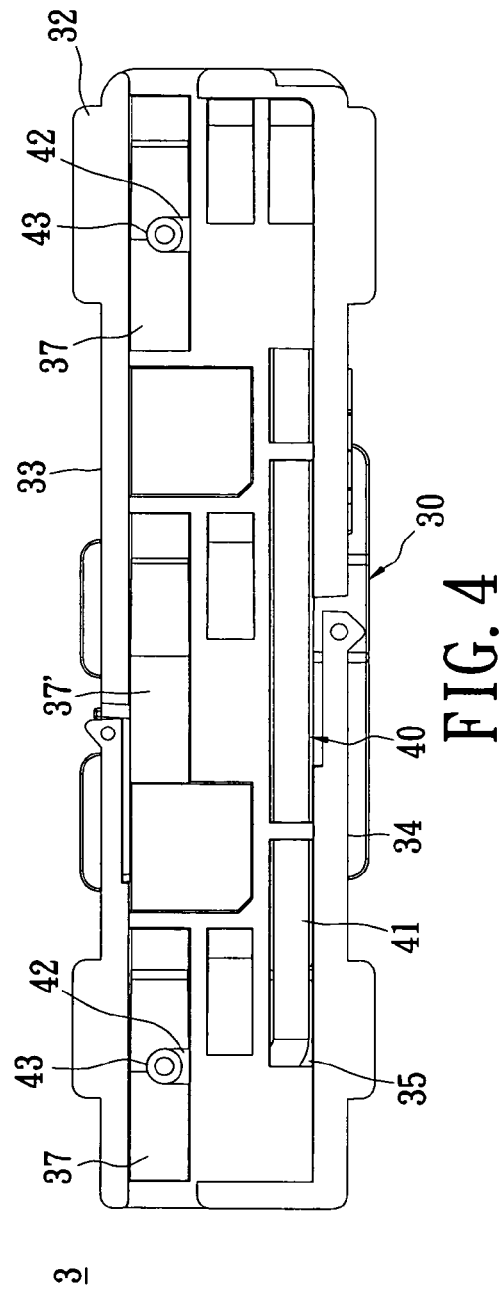
FIG. 4 is a rear view of the screw-less fastening device of the present invention.

The inner wall of the receiving space 35 of the body 30 has two plugging slots 37 that pass through the rear surface 32 of the body 30 (referring to FIG. 4). The body 30 slides between a first location (referring to FIG. 3) and a second location (referring to FIG. 7).

The fastening bracket 40 is made of metal material (such as stainless steel) that is bent and its cross-section is circular. The fastening bracket 40 includes a base portion 41, two contacting portions 42, and two plugging portions 43 (referring to FIG. 2). The base portion 41 is a long rod.

Two contacting portions 42 are parallel to each other, and extend from two ends of the base portion 41 that are bent upwards. Each of the contacting portions 42 is located in the track slot 36 and two ends of the contacting portion 42 are respectively contacting the first slanted surface 361 and the second slanted surface 362.

Two plugging portions 43 respectively extend from the two contacting portions 42 that are bent forward towards the housing 20. The two plugging portions 43 are located in the two plugging slots 37, and their ends extend outside the body 30. When the screw-less fastening device 3 is assembled, the fastening bracket 40 is placed in the body 30 via the opening 311, and is received in the receiving space 35.

When the screw-less fastening device 3 of the present invention is used, the body 30 of the screw-less fastening device 3 is received in the sliding space 22 corresponded by the housing 20 so that the body 30 can slide in the sliding space 22.

Reference is made to FIGS. 3~6. When the body 30 slides to the first location, the contacting portion 42 of the fastening bracket 40 is guided by the first slanted surface 361 to slide in the track slot 36. Therefore, the fastening bracket 40 moves towards the housing 20, and each of the plugging portions 43 is plugged in the first positioning hole 11 and the second positioning hole 21 so that the peripheral 10 is fastened in the housing 20.

Reference is made to FIGS. 7 and 8. When the body 30 slides to the second location, the contacting portion 42 of the fastening bracket 40 is guided by the second slanted surface 362 to slide in the track slot 36. Therefore, the fastening bracket 40 moves away from the housing 20. When each of the plugging portions 43 departs from the first positioning hole 11, the peripheral 10 can be disassembled from the housing 20.

In another embodiment, the body 30 has another track slot 36' located between the two track slots 36 (referring to FIG. 5). The tracking slot 36' includes a first slanted surface 361' and a second slanted surface 362' that are parallel to each other. The opening 311 of the body 30 is E-shaped. The body 30 also has another plugging slot 37' that passes through the rear surface 32 of the body 30 (referring to FIG. 4).

Therefore, a shorter fastening bracket 40' (referring to FIG. 2) is assembled in the body 30. The fastening bracket 40' also includes a base portion 41', two contacting portions 42', and two plugging portions 43'. The two contacting portions 42' respectively are located in the track slot 36 and the track slot 36', and the two plugging portions 43' respectively are located in the plugging slot 37 and the plugging slot 37' to form another screw-less fastening device 3'. The screw-less fastening device 3' also has the same function to fasten the peripheral 10, and is suitable for the peripheral 10 with first positioning holes 11 that its distance between the first positioning holes 11 is small, such as a FDD.

The screw-less fastening device of the present invention has the following characteristics:

1. The user can rapidly fasten or disassemble the peripheral by merely sliding the body. The user does not need to use the screwdriver to lock the screw. The required time and manpower is reduced. The problem of the screw being lost or dropped into the motherboard to make the motherboard to be in short-circuited is overcome. Furthermore, when the screw-less fastening device is not used, the screw-less fastening device is automatically received in the sliding space located at one side of the housing by utilizing the guiding device. The user does not need to receive the screw-less fastening device. The screw-less fastening device will not be lost.

2. The structure of the screw-less fastening device is simple. The body merely is made of plastic material with a general level, and the fastening bracket is made of stainless steel. The manufacturing cost is low.

3. The strength of the screw-less fastening device is strong, and the operation of the screw-less fastening device is easy and safe.

4. The body of the screw-less fastening device can match the fastening bracket with different length. Therefore, the screw-less fastening device can be applied to different peripherals without changing the body.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A screw-less fastening device, used for fastening a peripheral into a housing, wherein the peripheral has at least one first positioning hole, and one side of the housing has at least one second positioning hole, comprising:

a body having a front surface and a rear surface that is opposite the front surface and is close to the housing, wherein the interior of the body has a receiving space and at least two track slots linked to the receiving space, each of the track slots including a first slanted surface formed by the body, the front surface of the body has an opening linked to the receiving space and a second slanted surface that is parallel to the first slanted surface, and the inner wall of the receiving space of the body has at least two plugging slots that pass through the rear surface of the body; and a fastening bracket formed by bending a metal wire, wherein the fastening bracket is received into the receiving space via the opening of the body, the fastening bracket includes a base portion, two contacting portions extending from two ends of the base portion that are bent, and two plugging portions extending from the two contacting portions that are bent, each of the contacting portions is located in the track slot and two sides of the contacting portion individually contact the first slanted surface and the second slanted surface, and the two plugging portions are located in the two plugging slots;

wherein, the body slides between a first location and a second location, and when the body slides to the first location, the fastening bracket moves towards the housing and each of the plugging portions is plugged into the first positioning hole and the second positioning hole so that the peripheral is fastened inside the housing.

2. The screw-less fastening device as claimed in claim 1, wherein when the body slides to the second location, the fastening bracket moves away from the housing so that each of the plugging portions departs from the first positioning hole.

3. The screw-less fastening device as claimed in claim 1, wherein the cross-section of the fastening bracket is circular.

4. The screw-less fastening device as claimed in claim 1, wherein the two contacting portions of the fastening bracket extend from two ends of the base portion that are bent upwards.

5. The screw-less fastening device as claimed in claim 1, wherein the two plugging portions of the fastening bracket extend from ends of the two contacting portions that are bent forwards towards the housing.

6. The screw-less fastening device as claimed in claim 1, wherein the peripheral is a HDD, a FDD, a MCR, or an ODD.

7. The screw-less fastening device as claimed in claim 1, wherein one side of the housing has a sliding space for receiving the body of the screw-less fastening device.

* * * * *